United States Patent [19]

Hashimoto et al.

[11] Patent Number: 4,709,349

[45] Date of Patent: Nov. 24, 1987

[54] METHOD FOR MAINTAINING DISPLAY/PRINT MODE IN DISPLAY PRINTER

[75] Inventors: Sadakatsu Hashimoto; Fumio Kamei, both of Nara, Japan

[73] Assignee: Sharp Kabushiki Kaisha, Osaka, Japan

[21] Appl. No.: 859,206

[22] Filed: Apr. 28, 1986

Related U.S. Application Data

[63] Continuation of Ser. No. 573,375, Jan. 24, 1984, abandoned.

[30] Foreign Application Priority Data

Jan. 27, 1983 [JP] Japan ................................. 58-12182

[51] Int. Cl.⁴ .......................... G06F 3/00; G06F 13/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,582,897 | 6/1971 | Marsh, Jr. ............................ | 364/900 |
| 3,825,902 | 7/1974 | Brown et al. ....................... | 364/200 |
| 3,905,025 | 9/1975 | Davis et al. ......................... | 364/200 |
| 4,047,161 | 9/1977 | Davis .................................. | 364/200 |
| 4,091,447 | 5/1978 | Dillon et al. ....................... | 364/200 |
| 4,103,330 | 7/1978 | Thacker .............................. | 364/200 |
| 4,126,893 | 11/1978 | Cronshaw et al. ................. | 364/200 |
| 4,153,945 | 5/1979 | Actor et al. ........................ | 364/900 |
| 4,400,773 | 8/1983 | Brown et al. ....................... | 364/200 |
| 4,446,459 | 5/1984 | Bond, Jr. et al. .................. | 364/900 |
| 4,458,311 | 7/1984 | Clements et al. .................. | 364/200 |

Primary Examiner—Archie E. Williams, Jr.
Assistant Examiner—William G. Niessen
Attorney, Agent, or Firm—Birch, Stewart, Kolasch & Birch

[57] ABSTRACT

Disclosed is a method for causing an existing display and/or printing mode in a computer or the like to be preserved in sheltering areas located in memory upon commencement of an interrupt task. After completing such an interrupt task, the present invention causes use of the sheltered mode to be resumed. The present invention correctly preserves the originally existing display and/or printing mode until after completion of an externally generated interrupt task, thus effectively eliminating the undesirable process that is otherwise needed for reactivating the original mode.

3 Claims, 6 Drawing Figures

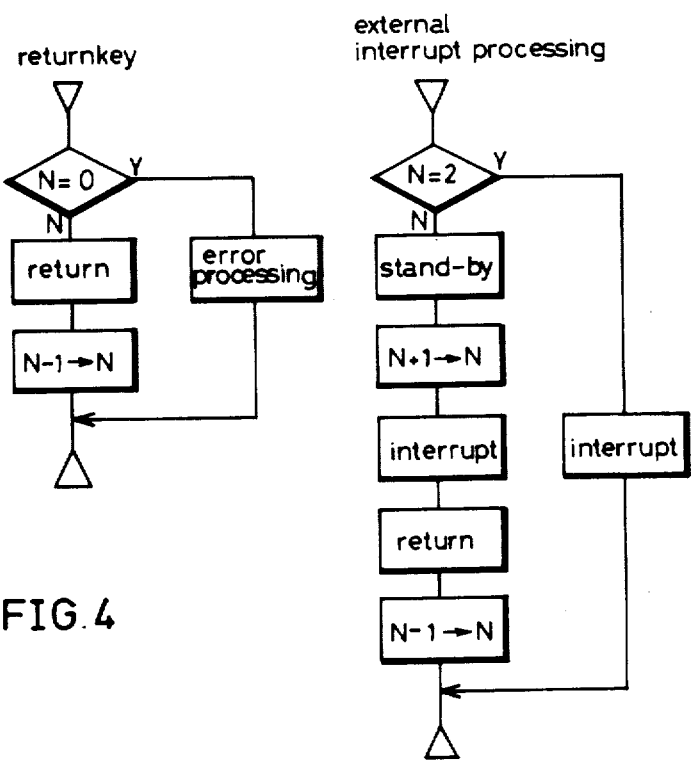
FIG. 4
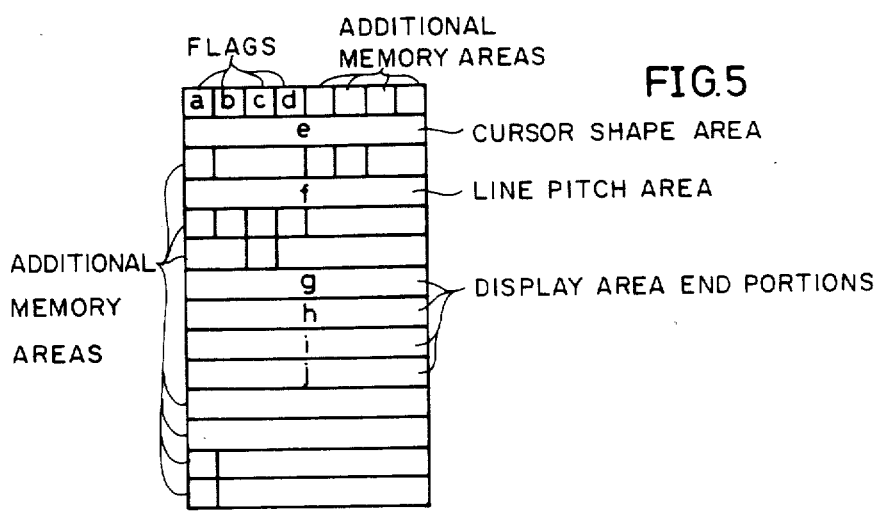
FIG. 5
FIG. 6

METHOD FOR MAINTAINING DISPLAY/PRINT MODE IN DISPLAY PRINTER

This application is a continuation of application Ser. No. 573,375 filed on Jan. 24, 1984, now abandoned.

BACKGROUND OF THE INVENTION

The present invention relates to a method for preserving the display/print mode in a display/printer unit.

When performing a designated display/printing operation using a computer system, if the display or printer unit is temporarily assigned to execute an externally activated interrupt task and then resumes the original operation, the display/print mode (for example, such as the tab position, line pitch, scroll, underline, inverse, and/or double angle mode) that was activated only for executing the interrupt task will still remain on the display/printer unit or the program mode will return to the initial state. As a result, in order to resume the originally designated display and/or printing operation, the designated mode has to be reactivated.

OBJECTS AND SUMMARY OF THE INVENTION

The present invention primarily aims at eliminating the disadvantageous problem discussed above. As soon as the computer system receives an externally generated interrupt task command, accordingly to the present invention a command is activated to store the existing display and/or printing mode in a reserve memory, and as soon as the externally activated interrupt task is completed, the stored mode is brought back to the designated display and/or printing mode. The present invention may effectuate both the storing and recovery of the desired mode via a key operation. For example, when a BASIC program is being executed using a computer system having a display/printer unit, the system also serving as an electronic mail terminal, and if an electronic message, for example, composed of Japanese and Chinese characters is received by said computer system, then the display mode will automatically vary to accomodate receipt of the message. However, the present invention enables the computer system to bring back the originally designated display mode as soon as the computer completes its function as a mail receiver before reactivating the required BASIC program. The present invention enables the computer system to cause the originally designated display mode to be stored and returned via a key operation if an interrupt task has to be executed using other modes while the system is engaged in the execution of an originally designated display mode.

BRIEF DESCRIPTION OF THE DRAWINGS

FIGS. 3 through 5, respectively, show flowcharts related to procedures for controlling the display/printer unit shown in FIG. 1; and FIG. 6 shows the storage format of display mode memory area DM or part of the controls governing the sheltering buffer areas B1 and B2 shown in FIG. 2.

DETAILED DESCRIPTION OF THE INVENTION

With reference to a preferred embodiment, details of the present invention are described below.

Figure 1:
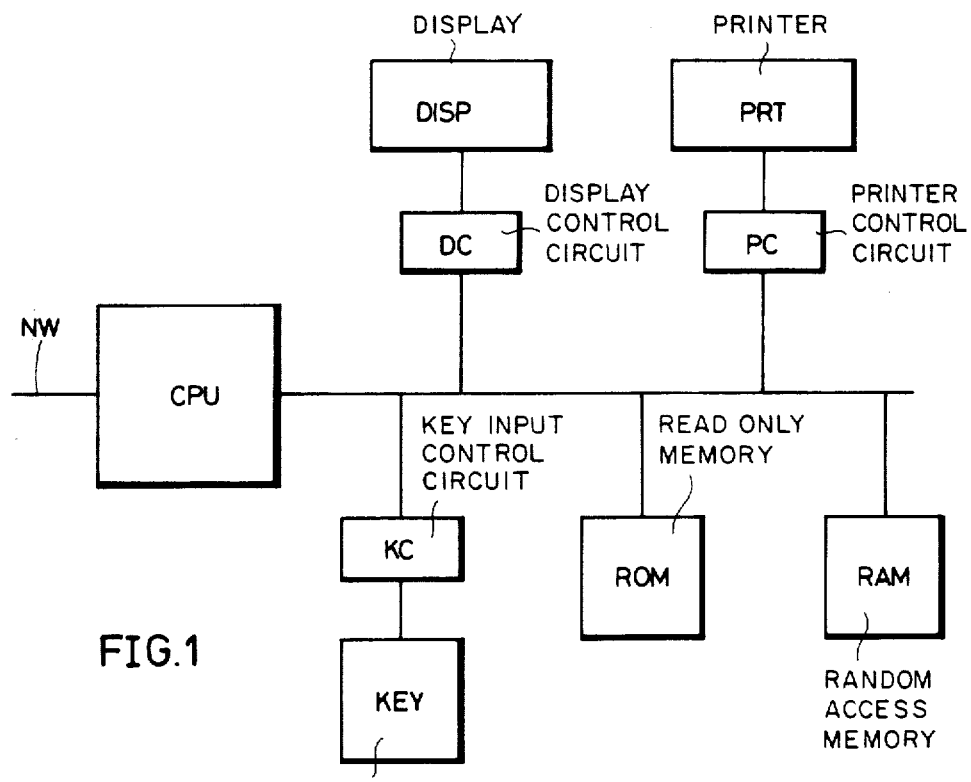
FIG. 1 is a simplified block diagram of the display and printer system of a preferred embodiment of the present invention.

FIG. 1 is a simplified block diagram of a computer system embodying the present invention. The computer system includes a CPU unit which may be composed of a microprocessor. DISP denotes a display unit that may comprise dot matrix LCD units; DC denotes the display control circuit; PRT denotes a printer unit; PC denotes the printer control circuit; KEY denotes the key input unit; KC denotes the key input control circuit; ROM is a read-only memory that stores the CPU control programs; RAM is a read-write memory containing the display mode memory areas and the sheltering buffer areas for the display mode memory; and NW is the network signal line connected to external CPU units.

Figure 2:
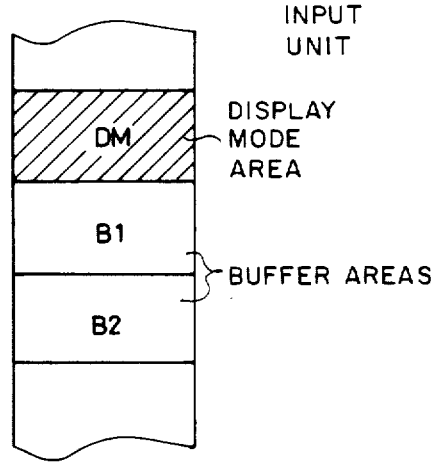
FIG. 2 shows a display mode memory area DM and the sheltering buffer areas B1 and B2 in RAM.

FIG. 2 shows the display mode memory area and its sheltering buffer area located in the RAM. DM is an area in which the existing display mode is stored, including information such as the tab position, line pitch, scroll, underline, inverse, and the double angle mode.

B1 and B2 are respectively the sheltering buffer areas, which store the same modes as those stored by DM in like manner. Since both B1 and B2 are comprised of two areas each, dual step sheltering can be performed.

Figure 3:
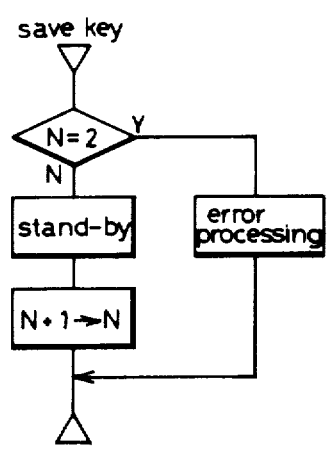

FIGS. 3 and 4, respectively are flowcharts showing procedures for controlling the shelter and return operations by pressing keys of the key input unit. If the existing display mode is to be preserved, the preserve designation key is operated. For example, the display mode preserve command might be executed by pressing key "T". In FIG. 3, N denotes a nesting counter. N=0 denotes a state in which no shelter mode is being applied. N=1 and N=2 respectively denote states in which the single and dual step shelter modes are being activated. As shown in FIG. 3, If N does not equal 2, a sheltering process is executed, thus counting up N. Sheltering process is executed by shifting the contents of respective areas shown in FIG. 2. In other words, the B1 contents are transferred to B2, whereas the DM contents are transferred to B1. As a result, if a new mode is entered after completing the mode preserving process, the new mode will be stored in DM, whereas the preceding mode will be preserved in B1.

If N=2 is entered, i.e., if a state in which a dual step sheltering is activated, then the mode preserving key operation is cancelled, causing an error message to be output to the display unit. FIG. 4 shows a process in which the return key is activated. If N does not equal 0, a return process will be executed, thus counting down N. The return process reverses the procedures described earlier, and are executed by transferring the B1 contents to DM and B2 contents to B1. If N=0, no mode is being sheltered, and so the return key operation is cancelled, causing an error message to be sent to the display unit.

FIG. 5 shows a process for dealing with an externally generated interrupt request signal. If N does not equal 2, a sheltering process will be executed, thus counting up N, followed by processing the external interrupt task. As soon as said interrupt task is completed, both the return and N count-down processes are executed. Thus, when an interrupt task must be performed, the originally existing mode can be properly sheltered and preserved until after the interrupt task is completed. If N=2, i.e., if the dual step sheltering is activated, no sheltering will be performed.

FIG. 6 shows the manner in which data is stored in area DM, which is a display mode memory area, which is the same as in areas B1 and B2, shown in terms of alphabetical reference. Said references "a" through "j" denote the following:

- a: A flag denoting an underline drawing mode.
- b: A flag denoting a mode in which a cursor is set to a double-unit width.
- c: A flag denoting a mode causing a cursor to be displayed at a still position.
- d: A flag denoting a mode in which no cursor is displayed.
- e: An area denoting the shape of a cursor.
- f. An area denoting a line pitch.
- g: An area denoting the lower end of the display area.
- h: An area denoting the upper end of the display area.
- i: An area denoting the right end of the display area, and
- j: An area denoting the left end of the display area.

Any of these display modes can be activated either by entering the mode designation command via the key operation, or automatically set by processing the external interrupt task.

As described above, a method for preserving an existing display and/or printing mode using a display/printer unit embodied by the present invention characteristically comprises storing data representing a display mode in a first area capable of storing a variety of display modes related either to the display or printing operation; providing sheltering buffer areas in a memory; transferring the contents of said first display mode memory area to one of said sheltering buffer areas before executing an external interrupt task; and transferring the contents of one of said sheltering buffer areas to said first mode memory areas after completing said interrupt task. The preferred embodiment of the present invention effectively provides a variety of advantages described below.

(1) In an independent case when a computer system incorporating a display/printer unit is used.

For example, when preparing a BASIC program by using a personal computer, display modes such as "line pitch=10 and character code=1 byte code" are typically used. If program preparation is interrupted by a request for, for example, processing a letter using Chinese characters, then the display mode will be switched to "line pitch=20 and character code=2 byte code". In such a case when any conventional computer system is employed, even if the desired BASIC program preparation task is resumed after completing the processing of the Chinese characters, the desired BASIC display mode no longer exists. Such a disadvantage can be effectively eliminated by the present invention in that it correctly preserves the originally existing display mode by sheltering data representing this mode before activating the Chinese character processing, and, after completing this, the preferred embodiment of the present invention causes the sheltered mode to be revived for implementing the originally designated display/printing.

(2) In a case when a computer system incorporating a display/printer unit is used as part of a network.

In this case, the same result as in the preceding case (1) is achieved. However, when using a system as defined in (1), since there is always time before the interrupt task is entered, any needed mode can be recalled in some fashion without being aided by the present invention, for example, by taking notes of a mode to be resumed after completing an interrupt task on a paper. However, if the system operation suddenly changes to any other mode in response to an unexpected network command, such an unexpected change of mode cannot be anticipated or precisely resumed by the operator. The present invention thus provides an extremely useful advantage in that any of the needed modes can be automatically and correctly preserved as required.

What is claimed is:

1. A method for preserving a display or print mode for use in a microprocessor system having a single random access memory and a display or printer which may be configured in one of a plurality of display or print modes, comprising the steps of:

storing first data representing a first said display or print mode employed for performing a first task in a first memory area of said single random access memory;

transferring said first data to a first sheltering buffer memory area of said single random access memory when said first task is interrupted to execute a second task; and retransferring said first data back to said first memory area of said single random access memory for resuming said first task.

2. A method as in claim 1, wherein second data representing a second said display or print mode is stored in said first memory area of said single random access memory during execution of said second task.

3. A method as in claim 2, further comprising the steps of:

transferring said first data in said first sheltering buffer memory area of said single random access memory to an additional sheltering buffer memory area of said single random access memory and transferring said second data in said first memory area of said single random access memory to said first sheltering buffer memory area of said single random access memory when said second task is interrupted to execute a third task.

* * * * *